(12) United States Patent
Champeix et al.

(10) Patent No.: US 11,531,049 B2
(45) Date of Patent: Dec. 20, 2022

(54) ELECTROMAGNETIC PULSE DETECTION

(71) Applicant: STMicroelectronics (Rousset) SAS, Rousset (FR)

(72) Inventors: Clement Champeix, Aix-en-Provence (FR); Mathieu Dumont, Marseilles (FR); Nicolas Borrel, Gardanne (FR); Mathieu Lisart, Aix en Provence (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 87 days.

(21) Appl. No.: 17/322,140

(22) Filed: May 17, 2021

(65) Prior Publication Data
US 2021/0405100 A1    Dec. 30, 2021

(30) Foreign Application Priority Data

Jun. 29, 2020   (FR) ...................... 2006815

(51) Int. Cl.
| | |
|---|---|
| *G01R 29/08* | (2006.01) |
| *G06F 21/55* | (2013.01) |
| *G06F 21/75* | (2013.01) |
| *H01L 23/00* | (2006.01) |
| *H01L 23/66* | (2006.01) |

(52) U.S. Cl.
CPC ..... *G01R 29/0878* (2013.01); *G01R 29/0814* (2013.01); *G06F 21/554* (2013.01); *G06F 21/755* (2017.08); *H01L 23/576* (2013.01); *H01L 23/66* (2013.01); *H01L 2223/6677* (2013.01)

(58) Field of Classification Search
CPC ....... H04L 9/004; G06F 21/75; H01L 23/576; H01L 23/573; G06K 19/07309
See application file for complete search history.

(56) References Cited

U.S. PATENT DOCUMENTS

| | | | |
|---|---|---|---|
| 2007/0180285 A1* | 8/2007 | Dembo | .................. H04L 9/003 713/193 |
| 2008/0204195 A1* | 8/2008 | Diorio | ................. H04L 63/0492 340/10.1 |
| 2019/0372751 A1* | 12/2019 | Yanamadala | ......... H01L 23/576 |

FOREIGN PATENT DOCUMENTS

EP    3264460    1/2018

OTHER PUBLICATIONS

Autosar, "E2E Protocol Specification", Part of Standard Release R19-11, Document ID No. 849, Nov. 28, 2019, 185 pages.
(Continued)

*Primary Examiner* — Alvaro E Fortich
*Assistant Examiner* — Zannatul Ferdous
(74) *Attorney, Agent, or Firm* — Slater Matsil, LLP (57) ABSTRACT

An embodiment integrated circuit includes a first electromagnetic pulse detection device that comprises a first loop antenna formed in an interconnection structure of the integrated circuit, a first end of the first antenna being connected to a first node of application of a power supply potential and a second end of the antenna being coupled to a second node of application of the power supply potential, and a first circuit connected to the second end of the first antenna and configured to output a first signal representative of a comparison of a first current in the first antenna with a first threshold.

17 Claims, 4 Drawing Sheets

(56) References Cited

OTHER PUBLICATIONS

Dumont, Mathieu et al., "Modeling of Electromagnetic fault injection", IEEE 12th International Workshop on the Electromagnetic Compatibility of Integrated Circuits (EMC Compo), Oct. 2019, 3 Pages.

Dumont, Mathieu et al., "Electromagnetic Fault Injection: how faults occur", IEEE Workshop on Fault Diagnosis and Tolerance in Cryptography (FDTC), Aug. 24, 2019, 8 pages.

El-Baze, David et al., "An Embedded Digital Sensor Against EM and BB Fault Injection", Workshop on Fault Diagnosis and Tolerance in Crytpography, Aug. 16, 2016, 9 pages.

Miura, Noriyuki et al., "PLL to the Rescue: A Novel EM Fault Countermeasure" ACM, DAC, Austin, Texas, http://dx.doi.org/10.1145/2897937.2898065, Jun. 2016, 6 pages.

Zussa, Loic et al., "Efficiency of a Glitch Detector Against Electromagnetic Fault Injection", IEEE Design, Automation & Test in Europe Conference & Exhibition, Mar. 24-28, 2014, 6 pages.

\* cited by examiner

ELECTROMAGNETIC PULSE DETECTION

CROSS-REFERENCE TO RELATED APPLICATIONS

This application claims the priority benefit of French Application No. 2006815, filed on Jun. 29, 2020, which application is hereby incorporated herein by reference.

TECHNICAL FIELD

The present disclosure generally relates to integrated electronic circuits and, more specifically, to the protection of such circuits against attacks.

BACKGROUND

A known way for hackers to obtain secure information of an electronic circuit, for example, a confidential cipher key stored by a memory of the circuit, is fault injection attack. This type of attacks comprises injecting one or a plurality of faults into the circuit and studying the circuit behavior as a response to such faults.

A known way to inject a fault in non-invasive fashion into an electronic circuit, that is, without modifying the physical integrity of the circuit, comprises generating, in the circuit, an electromagnetic radiation in the form of a pulse, for example, by means of a probe comprising an electromagnetic injection coil. Indeed, such an electromagnetic pulse may generate a fault in the circuit. For example, the electromagnetic pulse locally modifies the power supply potential of the circuit and/or the reference potential of the circuit, typically the ground, having the power supply potential referenced thereto, which results in a local increase or decrease of the power supply potential and/or of the reference potential.

SUMMARY

There is a need to improve the protection of integrated electronic circuits against fault injection attacks by means of an electromagnetic pulse.

An embodiment overcomes all or part of the disadvantages of known devices of detection of fault injection attacks by means of an electromagnetic pulse.

An embodiment provides an integrated circuit comprising a first electromagnetic pulse detection device comprising: a first loop antenna formed in an interconnection structure of the integrated circuit, a first end of the first antenna being connected to a first node of application of a power supply potential and a second end of the antenna being coupled to a second node of application of the power supply potential; and a first circuit connected to the second end of the first antenna and configured to output a first signal representative of a comparison of a first current in the first antenna with a first threshold.

According to an embodiment, the first threshold is representative of a presence of an electromagnetic pulse in a region of the interconnection structure, the first antenna being arranged in the region.

According to an embodiment, the second end of the first antenna is coupled to the second node by a first resistive element of the first circuit, the first signal being representative of a comparison of a potential of the second end of the antenna with a first potential representative of the first threshold.

According to an embodiment, a value of the first resistive element is controllable, a modification of the value of the first resistive element causing a modification of a value of the first threshold.

According to an embodiment, the first device further comprises a second circuit configured to generate a first alarm signal from the first signal output by the first circuit, the second circuit being preferably configured to switch the first alarm signal to an active state and then hold the active state after a switching of the first signal from a state indicating that the first current is smaller than the first threshold to a state indicating that the first current is greater than the first threshold.

According to an embodiment, a distance between the first antenna and the second circuit is greater than 400 µm.

According to an embodiment, the first antenna extends over at least two metal levels of the interconnection structure.

According to an embodiment, the circuit further comprises a second electromagnetic pulse detection device comprising: a second loop antenna formed in the interconnection structure of the integrated circuit, a first end of the second antenna being connected to a third node of application of a reference potential and a second end of the second antenna being coupled to a fourth node of application of the reference potential; and a second circuit connected to the second end of the second antenna and configured to output a second signal representative of a comparison of a second current in the second antenna with a second threshold.

According to an embodiment, the first and second devices are associated, the first and second antennas being stacked on each other and preferably having the same shape and the same dimensions.

According to an embodiment, the first threshold is representative of a presence of an electromagnetic pulse in a region of the interconnection structure, the first antenna being arranged in the region, and the second threshold is representative of a presence of an electromagnetic pulse in the region of the interconnection structure, the second antenna being arranged in the region.

According to an embodiment, the second end of the first antenna is coupled to the second node by a first resistive element of the first circuit, the first signal being representative of a comparison of a potential of the second end of the first antenna with a first potential representative of the first threshold, and the second end of the second antenna is coupled to the fourth node by a second resistive element of the second circuit, the second signal being representative of a comparison of a potential of the second end of the second antenna with a second potential representative of the second threshold.

According to an embodiment, a value of the first resistive element is controllable, a modification of the value of the first resistive element causing a modification of a value of the first threshold, and/or a value of the second resistive element is controllable, a modification of the value of the second resistive element causing a modification of a value of the second threshold.

According to an embodiment, the first device further comprises a third circuit configured to generate a first alarm signal from the first signal output by the first circuit, the third circuit being preferably configured to switch the first alarm signal to an active state and then hold the active state after a switching of the first signal from a state indicating that the first current is smaller than the first threshold to a state indicating that the first current is greater than the first threshold. According to this embodiment, the second device further comprises a fourth circuit configured to generate a second alarm signal from the second signal output by the second circuit, the fourth circuit being preferably configured to switch the second alarm signal to an active sate and then hold the active state after a switching of the second signal from a state indicating that the second current is smaller than the second threshold to a state indicating that the second current is greater than the second threshold.

According to an embodiment, a distance between the first antenna and the third circuit is greater than 400 µm, and a distance between the second antenna and the fourth circuit is greater than 400 µm.

According to an embodiment, the first antenna extends over a plurality of metal levels of the interconnection structure and/or the second antenna extends over a plurality of metal levels of the interconnection structure.

According to an embodiment, the circuit comprises a plurality of associations of a first device and of a second device.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, usual integrated electronic circuits where an electromagnetic pulse detection device may be provided have not been detailed, the electromagnetic pulse detection devices described herein being compatible with such usual integrated circuits. Further, the theory relative to fault injection attacks by means of an electromagnetic pulse is not detailed herein, such a theory being accessible to those skilled in the art in many publications such as, for example, the article entitled "Electromagnetic Fault Injection: how faults occur ?" of Dumont et al, disclosed in 2019 in "*Workshop on Fault Diagnosis and Tolerance in Cryptography*" (FDTC).

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
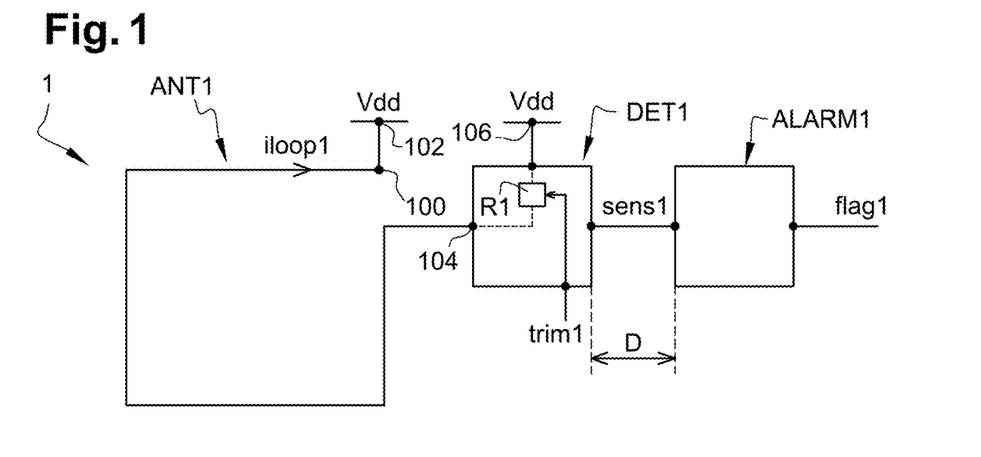
FIG. 1 schematically shows an embodiment of an electromagnetic pulse detection device.

FIG. 1 schematically shows an embodiment of an electromagnetic pulse detection device 1.

Although this is not shown in FIG. 1, device 1 forms part of an integrated circuit. The integrated circuit comprises components formed inside and/or on top of a semiconductor layer, and an interconnection structure resting on the semiconductor layer. The interconnection structure is configured to electrically couple these components to one another and/or to connection pads arranged on the interconnection structure.

Device 1 comprises an antenna ANT1 and a circuit DET1.

Antenna ANT1 is formed of a conductive path formed by conductive elements, typically portions of metal layers and vias, of the interconnection structure of the integrated circuit. Antenna ANT1 is a loop antenna. The conductive path of antenna ANT1 thus forms at least one loop.

An end 100 of antenna ANT1 is connected to a node 102 of application of a power supply potential Vdd of the integrated circuit, that is, node 102 is configured to be at potential Vdd during the operation of the integrated circuit. Potential Vdd is referenced to a reference potential GND (not shown in FIG. 1), for example, the ground, potential Vdd being preferably positive. A second end 104 of antenna ANT1 is coupled to a node 106 of application of power supply potential Vdd, for example, via the circuit DET1 to which the second end is connected.

In top view, for example viewing the interconnection structure of the integrated circuit along a direction orthogonal to the semiconductor layer of the integrated circuit, antenna ANT1 preferably occupies a surface area smaller than 400 µm*400 µm, for example a surface area smaller than 30 µm*30 µm. Indeed, usual electromagnetic pulse injection probes or coils have a minimum diameter greater than 400 µm. The magnetic field that they generate is then located, in a plane parallel to the semiconductor layer of the integrated circuit, within a surface area substantially equal to their diameters, and is further maximum opposite the edges of these probes. Thus, the provision of an antenna ANT1 having a surface area smaller than 400 µm*400 µm enables to more efficiently detect the magnetic field generated by known electromagnetic pulse injection coils than with an antenna of larger dimensions.

Preferably, antenna ANT1 extends over at least two metal levels of the interconnection structure, that is, it comprises portions of metal tracks belonging to a plurality of metal levels. This enables antenna ANT1 to be more sensitive to an electromagnetic pulse than if it extended over a single metal level of the interconnection structure.

Detection circuit DET1 is connected to antenna ANT1, and more particularly to end 104 of antenna ANT1. Detection circuit DET1 is configured to output a signal sens1 representative of a comparison of a current iloop1 in antenna ANT1 with a first threshold Ith1. Current iloop1 is, for example, considered as flowing from end 104 of antenna ANT1 to end 100 of antenna ANT1. Current iloop1 is a current induced in antenna ANT1 when antenna ANT1 is submitted to an electromagnetic pulse.

Preferably, signal sens1 is a binary signal having a first binary state indicating that current iloop1 is smaller than threshold Ith1, and having a second binary state indicating that current iloop1 is greater than threshold Ith1.

Preferably, threshold Ith1 is determined, for example during a characterization or calibration phase, so that current iloop1 is greater than threshold Ith1 if an electromagnetic pulse corresponding to a fault injection attack is generated in a region of the interconnection structure comprising antenna ANT1, and smaller otherwise.

According to an embodiment, circuit DET1 comprises a resistive element R1, end 104 of antenna ANT1 being coupled to node 106 via resistive element R1. As an example, resistive element R1 has a terminal connected to end 104 of antenna ANT1 and another terminal connected to node 106. Further, although this is not shown in FIG. 1, circuit DET1 comprises a circuit configured to generate signal sens1, so that signal sens1 is representative of the comparison of a first potential V1 with the potential of end 104 of antenna ANT1, that is, the potential of node 104 of connection of antenna ANT1 to resistive element R1. Potential V1 is representative of threshold Ith1 and, more exactly, is determined by threshold Ith1. As an example, potential V1 is determined so that the potential of node 104 is greater, respectively, smaller, than potential V1 when current iloop1 is smaller, respectively greater, than threshold Ith1.

According to an embodiment, the value of resistive element R1 is controllable, for example, by a signal trim1. A modification of the value of component R1 causes, for a given loop iloop1, a modification of the potential of node 104, which amounts to modifying the value of threshold Ith1. Thus, threshold Ith1 may be determined so that an electromagnetic radiation lower than an electromagnetic pulse corresponding to a fault injection attack is not detected. This enables to avoid detecting an electromagnetic radiation which does not correspond to an attack, for example, an electromagnetic radiation emitted by the integrated circuit or by its environment.

According to an embodiment, device 1 further comprises a circuit ALARM1. Circuit ALARM1 is configured to generate an alarm signal, or flag, flag1 from signal sens1. Preferably, after a switching of signal sens1 from its first binary state to its second binary state, circuit ALARM1 is configured to switch alarm signal flag1 to an active state, that is, a state indicating that an electromagnetic pulse has been detected, and then hold or store the active state of signal flag1.

As an example, circuit ALARM1 comprises a synchronous flip-flop (not shown), for example, a D-type flip-flop, synchronized on signal sens1, for example, synchronized on edges of signal sens1.

According to an embodiment, a distance D between, on the one hand, circuit ALARM1 and, on the other hand, antenna ANT1 or the assembly of antenna ANT1 and of circuit DET1, is greater than 400 µm. Indeed, as previously mentioned, usual electromagnetic pulse injection coils have a minimum diameter greater than 400 µm, and the provision of a distance D greater than this minimum diameter enables, when antenna ANT1 is submitted to an electromagnetic pulse generated by such a coil, circuit ALARM1 not to be disturbed by the electromagnetic pulse.

In operation, in the absence of an electromagnetic pulse, current iloop1 is zero and the potential of node 104 is equal to that of node 106. The potential of node 104 is then greater than potential V1, which indicates that current iloop1 is smaller than current Ith1. Signal sens1 is in its first binary state and indicates the absence of an electromagnetic pulse in the region of antenna ANT1. Further, alarm signal flag1 is in an inactive state.

When an electromagnetic pulse is generated in the region of antenna ANT1 or, in other words, when antenna ANT1 is submitted to an electromagnetic pulse, and this pulse results in current iloop1 becoming greater than threshold Th1, that is, for example, the voltage drop in element R1 is such that the potential of node 104 becomes smaller than potential V1, signal sens1 switches to its second binary state, whereby signal flag1 switches to its active state.

The inventors have observed that device 1 is more sensitive to electromagnetic pulses said to be positive, that is, electromagnetic pulses resulting from the application of a positive voltage pulse across the electromagnetic pulse injection coil, than to electromagnetic pulses said to be negative, that is, electromagnetic pulses resulting from the application of a negative voltage pulse across the electromagnetic pulse injection coil.

Such a stronger sensitivity to positive electromagnetic pulses than to negative electromagnetic pulses results from the fact that in device 1, the two ends 100 and 104 of antenna ANT1 are coupled, or even connected for end 100, to nodes 102 and 106 of application of potential Vdd. Indeed, the inventors have observed that positive electromagnetic pulses more strongly modify power supply potential Vdd than reference potential GND.

Figure 2:
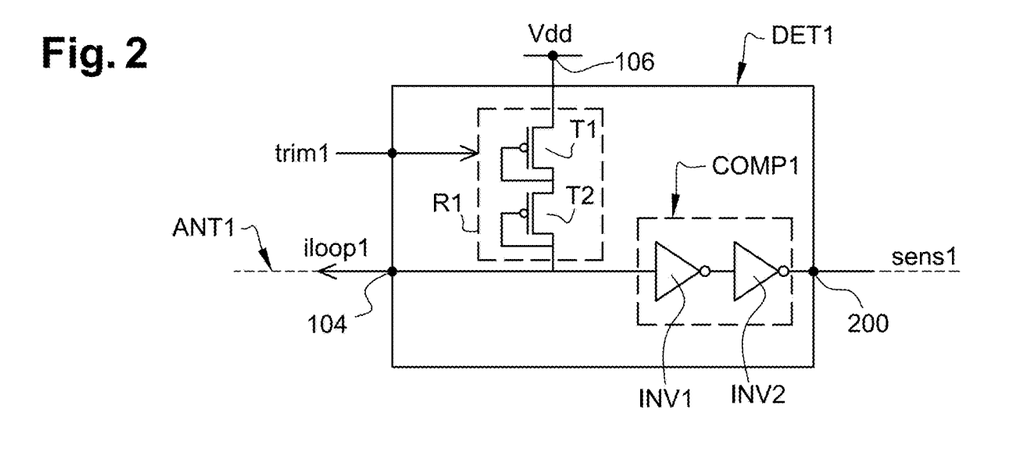
FIG. 2 shows, in the form of a circuit, an embodiment of a circuit of the device of FIG. 1.

FIG. 2 shows, in the form of a circuit, an embodiment of the circuit DET1 of the device 1 of FIG. 1.

In this embodiment, circuit DET1 comprises resistive element R1 (delimited by dotted lines in FIG. 2). In this example, resistive element R1 comprises two MOS ("Metal Oxide Semiconductor") transistors T1 and T2 series-connected between nodes 106 and 104. Each of transistors T1 and T2 is diode-assembled, that is, each transistor T1, T2 has its gate connected to its drain. As an example, transistors T1 and T2 have a P channel and have their sources arranged on the side of node 106 and their drains arranged on the side of node 104.

Circuit DET1, delimited by dotted lines in FIG. 2, further comprises a circuit COMP1 configured to generate signal sens1 by comparing the potential of node 104 with potential V1 or, in other words, based on a comparison of the potential of node 104 with potential V1.

As an example, circuit COMP1 comprises, as shown in FIG. 2, at least one inverter IVN1 having an input coupled to node 104 and having an output coupled to an output terminal 200 of circuit DET1 where signal sens1 is available. Thus, in the absence of an electromagnetic pulse, the potential Vdd of node 106 is present at the input of inverter INV1. The output of inverter INV1 then is at its reference potential GND and forces signal sens1 to its first binary state. When antenna ANT1 is submitted to an electromagnetic pulse, the potential of node 104 decreases to a value smaller than the switching threshold V1 of inverter INV1. The output of inverter INV1 then switches to potential Vdd, which forces the switching of signal sens1 to its second binary state.

More particularly, in the present example, the output of inverter INV1 is coupled to terminal 200 by an inverter INV2. Thus, the first and second states of signal sens1 correspond, in this example, to respective potentials Vdd and GND.

In this example, the switching threshold V1 of inverter INV1 and the value of component R1 set the value of threshold Ith1. As shown in the example of FIG. 2, threshold Ith1 is controllable by modifying the value of resistive element R1.

In another example, not shown, circuit COMP1 comprises an operational amplifier instead of inverters INV1 and INV2. The amplifier has an input coupled, preferably connected, to node 104, another input coupled, preferably connected, to a node of application of potential V1, and an output coupled or connected to terminal 200. In this example, threshold value Ith1 may be modified by modifying the value of resistive element R1 and/or by modifying the value of potential V1.

It will be within the abilities of those skilled in the art to provide other circuits DET1 than that described in relation with FIG. 2, particularly to modify circuit COMP1, for example, according to the potential levels corresponding to the first and second states of signal sens1.

Figure 3:
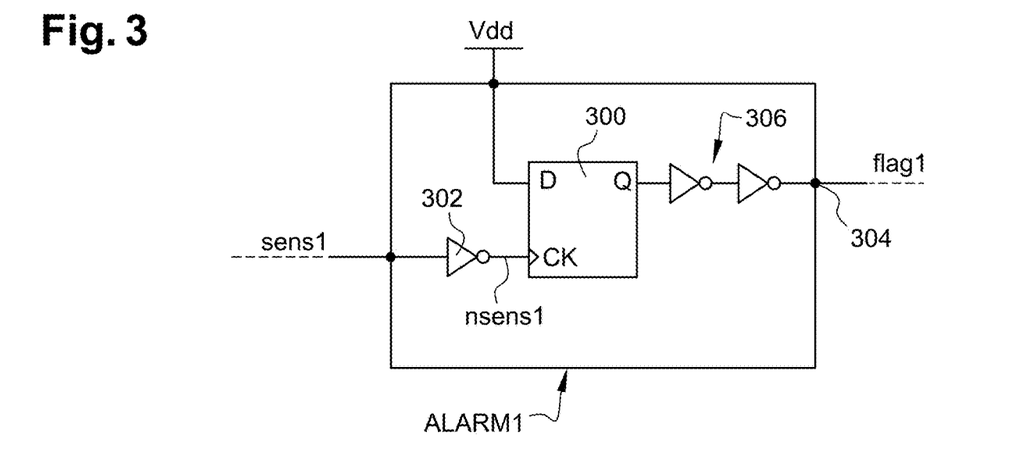
FIG. 3 shows, in the form of a circuit, an embodiment of another circuit of the device of FIG. 1.

FIG. 3 shows, in the form of a circuit, an embodiment of the circuit ALARM1 of device 1.

In this example, circuit ALARM1 comprises a D-type flip-flop 300. It is considered in the present example that circuit ALARM1 receives the signal sens1 output by the circuit DET1 of FIG. 2, that is, more generally, that the first and second binary states of signal sens1 correspond to respective potentials Vdd and GND. It is further considered that a CK synchronization input of flip-flop 300 is active on rising edges of the signal that it receives. Thus, in the present example, a circuit 302 configured to generate a binary signal nsens1 complementary to signal sens1 is provided in circuit ALARM1. Circuit 302, for example, an inverter, receives signal sens1 and supplies signal nsens1 to the CK input of flip-flop 300.

The D data input of flip-flop 300 receives potential Vdd. When an electromagnetic pulse is detected and signal sens1 switches from its first state to its second state, signal sens1 exhibits a rising edge, whereby potential Vdd is copied and stored on the Q output of flip-flop 300.

The Q output of flip-flop 300 is coupled to an output 304 of circuit ALARM1 on which signal flag1 is available, the level or state of the Q output of flip-flop 300 determining the active or inactive state of signal flag1.

More particularly, in the present example, signal flag1 is active when it is at potential Vdd, and inactive when it is at a potential GND.

A circuit 306 configured to generate signal flag1 from the output signal of flip-flop 300 may be provided to couple the Q output of flip-flop 300 to terminal 304. In the present example, circuit 306 is formed of two inverters series-connected between the Q output of flip-flop 300 and terminal 304.

It will be within the abilities of those skilled in the art to provide other circuits ALARM1 than that illustrated by FIG. 3. Particularly, it will be within the abilities of those skilled in the art to adapt, or even to suppress, circuit 302 and/or circuit 306 according to the potential level of signal flag1 corresponding to the active state of signal flag1 and/or to the potential levels corresponding to the first and second states of signal sens1.

A device 1 capable of detecting positive electromagnetic pulses has been described up to now. It would be desirable to also detect negative electromagnetic pulses.

Thus, according to an embodiment, the inventors provide associating device 1 with a device 4 capable of detecting negative electromagnetic pulses.

Figure 4:
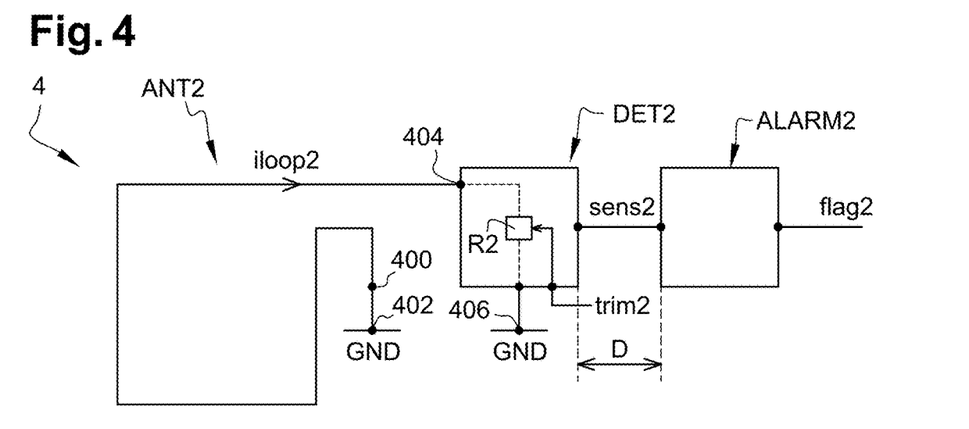
FIG. 4 schematically shows another embodiment of an electromagnetic pulse detection device.

FIG. 4 schematically shows an embodiment of such an electromagnetic pulse detection device 4.

According to an embodiment, device 4 is associated with a device 1 (not shown in FIG. 4).

Device 4 comprises an antenna ANT2 and a circuit DET2.

Antenna ANT2 is formed of a conductive path formed by conductive elements of the interconnection structure of the integrated circuit. Antenna ANT2 is a loop antenna.

An end 400 of antenna ANT2 is connected to a node 402 of application of a reference potential GND of the integrated circuit, typically the ground. A second end 404 of antenna ANT2 is coupled to a node 406 of application of potential GND, for example, via detection circuit DET2, having second end 404 connected thereto.

In top view, for example, viewing the interconnection structure of the integrated circuit along a direction orthogonal to the semiconductor layer of the integrated circuit, antenna ANT2 occupies a surface area smaller than 400 μm*400 μm, for example a surface area smaller than 30 μm*30 μm.

Preferably, antenna ANT2 has the same shape and the same dimensions as the antenna ANT1 of device 1 (FIG. 1) to which device 4 is associated.

Preferably, the antennas ANT1 and ANT2 of the two associated devices 1 and 4 are stacked on each other.

Preferably, antenna ANT2 extends over at least two metal levels of the interconnection structure.

Detection circuit DET2 is connected to antenna ANT2, and more particularly to end 404 of antenna ANT2. Detection circuit DET2 is configured to output a signal sens2 representative of a comparison of a current iloop2 in antenna ANT2 with a threshold Ith2. In this embodiment, current iloop2 is considered as flowing from end 400 of antenna ANT2 to end 404 of antenna ANT2.

Preferably, signal sens2 is a binary signal having a first binary state indicating that current iloop2 is smaller than threshold Ith2, and having a second binary state indicating that current iloop2 is greater than threshold Ith2.

Preferably, threshold Ith2 is determined, for example during a characterization or calibration phase, so that current iloop2 is greater than threshold Ith2 if an electromagnetic pulse corresponding to a fault injection attack is generated in a region of the interconnection structure comprising antenna ANT2, and smaller otherwise.

According to an embodiment, circuit DET2 comprises a resistive element R2, the end 404 of antenna ANT2 being coupled to node 406 via resistive element R2. As an example, resistive element R2 has a terminal connected to end 404 of antenna ANT2 and another terminal connected to node 406. Further, although this is not shown in FIG. 4, circuit DET2 comprises a circuit configured to generate signal sens2, so that signal sens2 is representative of the comparison of a potential V2 with the potential of end 404 of antenna ANT2, that is, the potential of node 404 of connection of antenna ANT2 to resistive element R2. Potential V2 is representative of threshold Ith2 and, more exactly, is determined by threshold Ith2. As an example, potential V2 is determined so that the potential of nod 404 is greater, respectively smaller, than potential V2 when current iloop2 is greater, respectively smaller, than threshold Ith2

According to an embodiment, the value of resistive element R2 is controllable, for example, by a signal trim2. A modification of the value of component R2 causes, for a given loop iloop2, a modification of the potential of node 404, which amounts to modifying the value of threshold Ith2.

According to an embodiment, device 4 further comprises a circuit ALARM2. Circuit ALARM2 is configured to generate an alarm signal, or flag, flag2 from signal sens2. Preferably, after a switching of signal sens2 from its first binary state to its second binary state, circuit ALARM2 is configured to switch alarm signal flag2 to an active state, that is, a state indicating that an electromagnetic pulse has been detected, and then hold or store the active state of signal flag2.

As an example, circuit ALARM2 comprises a synchronous flip-flop (not shown), for example, a D-type flip-flop, synchronized on edges of signal sens2.

According to an embodiment, a distance D between, on the one hand, circuit ALARM2 and, on the other hand, antenna ANT2 or the assembly of antenna ANT2 and of circuit DET2, is greater than 400 μm.

In operation, in the absence of an electromagnetic pulse, current iloop2 is zero and the potential of node 404 is equal to that of node 406. The potential of node 404 is then greater than potential V2, which indicates that current iloop2 is smaller than current Ith2. Signal sens2 is in the first state and indicates the absence of an electromagnetic pulse in the region of antenna ANT2. Further, alarm signal flag2 is in an inactive state.

When antenna ANT2 is submitted to an electromagnetic pulse and current iloop2 becomes greater than threshold Ith2, that is, for example, the voltage drop in element R2 is such that the potential of node 404 becomes greater than potential V2, signal sens2 switches to its second state, whereby signal flag2 switches to its active state.

The inventors have observed that device 4 is more sensitive to so-called negative electromagnetic pulses due to the fact that the two ends 400 and 404 of antenna ANT2 are coupled, or even connected for end 400, to nodes 402 and 406 of application of potential GND. Indeed, the inventors have observed that negative electromagnetic pulses more strongly modify potential GND than potential Vdd.

Figure 5:
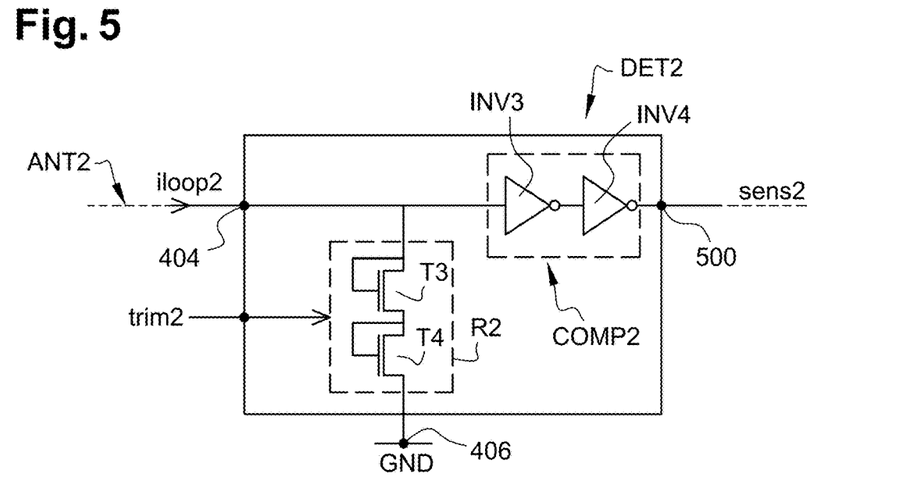
FIG. 5 shows, in the form of a circuit, an embodiment of a circuit of the device of FIG. 4.

FIG. 5 shows, in the form of a circuit, an embodiment of the circuit DET2 of the device 4 of FIG. 4.

In this embodiment, circuit DET2 comprises resistive element R2 (delimited by dotted lines in FIG. 5). In the present example, resistive element R2 comprises two MOS transistors T3 and T4 series-connected between nodes 406 and 404. Each of transistors T3 and T4 is diode-assembled. As an example, transistors T3 and T4 have an N channel and have their sources arranged on the side of node 406 and their drains arranged on the side of node 404.

Circuit DET2 further comprises a circuit COMP2 configured to generate signal sens2 by comparing the potential of node 404 with potential V2.

As an example, circuit COMP2 comprises, as shown in FIG. 5, at least one inverter IVN3 having an input coupled to node 404 and having an output coupled to an output terminal 500 of circuit DET2 where signal sens2 is available. More particularly, in the present example, the output of inverter INV3 is coupled to terminal 500 by an inverter INV4. Thus, in the present example, the first and second states of signal sens2 respectively correspond to potentials GND and Vdd and potential V2 corresponds to the switching threshold of inverter INV3.

In this example, the switching threshold V2 of inverter INV3 and the value of component R2 set the value of threshold Ith2. As shown in the example of FIG. 5, threshold Ith2 is controllable by modification of the value of resistive element R2.

In another example, not shown, circuit COMP2 comprises an operational amplifier instead of inverters INV3 and INV4, similarly to what has been described for circuit DET1. In this example, the value of threshold Ith2 may be modified by modification of the value of resistive element R2 and/or by modification of the value of the potential V2 received by the operational amplifier.

It will be within the abilities of those skilled in the art to provide other circuits DET2 than that described in relation with FIG. 5, particularly to modify circuit COMP2, for example, according to the potential levels corresponding to the first and second states of signal sens2.

Figure 6:
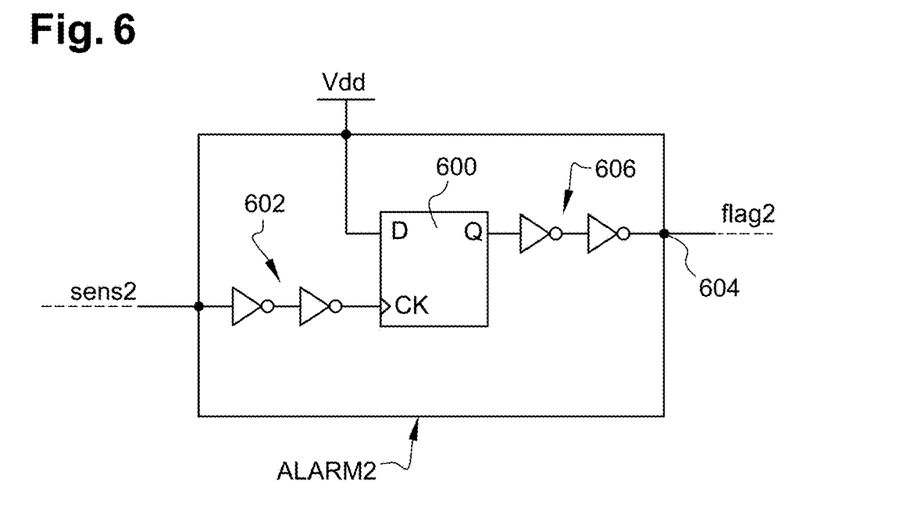
FIG. 6 shows, in the form of a circuit, an embodiment of another circuit of the device of FIG. 4.

FIG. 6 shows, in the form of a circuit, an embodiment of the circuit ALARM2 of device 4.

In this example, circuit ALARM2 comprises a D-type flip-flop 600. It is considered in the present example that circuit ALARM2 receives the signal sens2 output by the circuit DET2 of FIG. 5, that is, more generally, that the first and second binary states of signal sens2 correspond to respective potentials GND and Vdd. It is further considered that the CK synchronization input of flip-flop 600 is active on rising edges of the signal that it receives. Signal sens2 may thus be directly supplied to the CK input of flip-flop 600, or, as shown in FIG. 6, be shaped by a circuit 602 comprising, in the present example, two series-connected inverters, before being supplied to the CK input.

The D data input of flip-flop 600 receives potential Vdd. Thus, when an electromagnetic pulse is detected and signal sens2 switches from its first state to its second state, potential Vdd is copied and stored on the Q output of flip-flop 600.

The Q output of flip-flop 600 is coupled to an output 604 of circuit ALARM2 on which signal flag2 is available, the level of state of the Q output of flip-flop 600 determining the active or inactive state of signal flag2.

More particularly, in the present example, signal flag2 is active when it is at potential Vdd, and inactive when it is at a potential GND.

A circuit 606 configured to generate signal flag2 from the Q output signal of flip-flop 600 may be provided to couple the Q output of flip-flop 600 of terminal 604. In the present example, circuit 606 is formed of two inverters series-connected between the Q output of flip-flop 600 and terminal 604.

It will be within the abilities of those skilled in the art to provide other circuits ALARM2 than that illustrated by FIG. 6. Particularly, it will be within the abilities of those skilled in the art to adapt, or even to suppress, circuit 602 and/or circuit 606 according to the potential level of signal flag2 corresponding to the active state of signal flag2 and/or to the potential levels corresponding to the first and second states of signal sens2.

Figure 7:
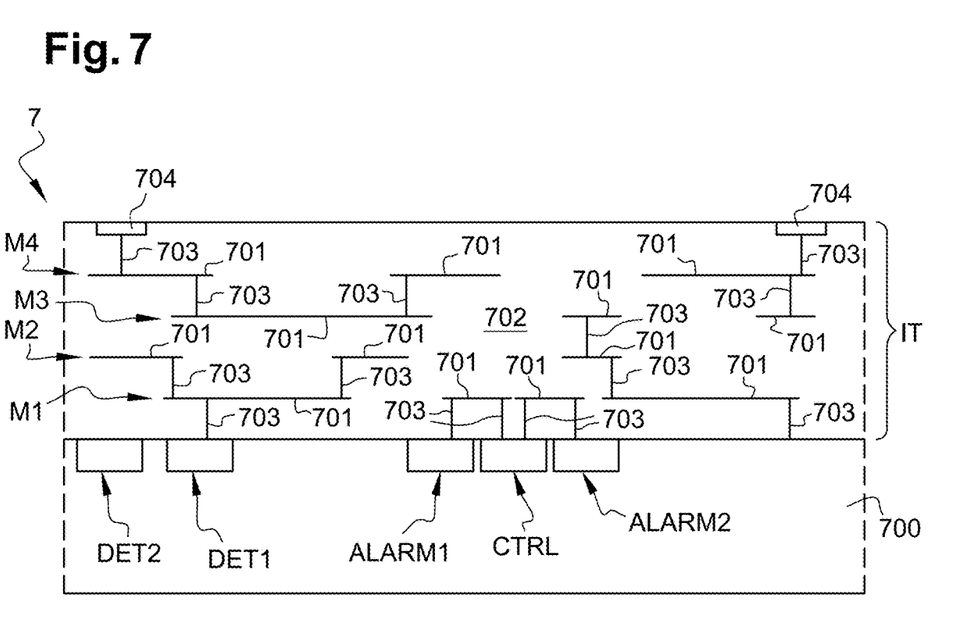
FIG. 7 is a partial simplified cross-section view of an embodiment of an integrated circuit.

FIG. 7 is a partial simplified cross-section view of an embodiment of an integrated circuit 7.

Integrated circuit 7 comprises a semiconductor layer 700, for example, made of silicon. Layer 700 is for example a semiconductor substrate or a semiconductor layer resting on an insulator layer (not shown), that is, a semiconductor-on-insulator or SOI layer.

Circuit 7 further comprises an interconnection structure IT resting on layer 700. Interconnection structure IT comprises portions of metal layers 701 embedded in insulating layers, here shown in the form of a single insulating layer 702. The portions of metal layers 701 which are arranged at a same level in structure IT form a metal level of structure IT. In the shown example, structure IT comprises four metal levels M1, M2, M3, and M4.

Vias 703 crossing insulating layer 702 enable to electrically couple portions of metal layers 701 to one another, and/or to components or circuits formed inside and/or on top of layer 700, and/or to connection pads 704 arranged on interconnection structure IT.

In this embodiment, integrated circuit 7 comprises a device 1 (FIG. 1), only circuits DET1 and ALARM1 thereof being shown. Circuits DET1 and ALARM1 are formed inside and/or on top of layer 700. The antenna ANT1 (not shown) of device 1 is arranged in the interconnection structure and is formed of vias 703 and of portions of metal layers 701. Antenna ANT1 is for example arranged above circuit DET1.

As shown in FIG. 7, circuit ALARM1 may be coupled to a control and processing circuit CTRL of integrated circuit 7. Circuit CTRL receives alarm signal flag1 and may be configured to implement countermeasures, for example, a resetting of circuit 7, when signal flag1 is active.

In the embodiment illustrated in FIG. 7, device 1 is associated with a device 4 (FIG. 4), only circuits ALARM2 and DET2 thereof being shown. Circuits DET2 and ALARM2 are formed inside and/or on top of layer 700. The antenna ANT2 (not shown) of device 4 is arranged in interconnection structure IT and is formed of vias 703 and of portions of metal layers 701. Antenna ANT2 is for example arranged above circuit DET2.

Preferably, antenna ANT2 and antenna ANT1 are arranged in a same region of interconnection structure IT. Preferably, antennas ANT1 and ANT2 have identical or similar dimensions and shapes. Preferably, antennas ANT1 and ANT2 are arranged one above the other, that is, they are stacked on each other.

As shown in FIG. 7, circuit ALARM2 may be coupled to circuit CTRL to supply it with alarm signal flag2, circuit CTRL being capable of being configured to implement countermeasures, for example, a resetting of circuit 7, when signal flag2 is active.

Although a single device 1, preferably associated with a device 4, has been described up to now, a plurality of devices 1, preferably each associated with a device 4, may be provided in circuit 7 to detect electromagnetic pulses in different regions of the interconnection structure IT of circuit 7.

Figure 8:
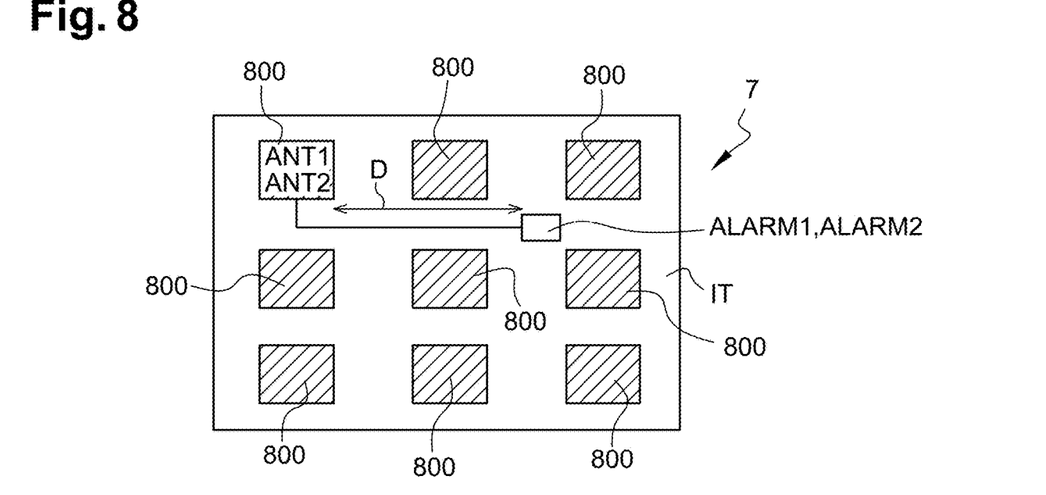
FIG. 8 is a partial simplified top view illustrating an example of implementation of a plurality of devices of FIG. 1 and/or of FIG. 4 in an integrated circuit.

FIG. 8 is a partial simplified top view illustrating an example of implementation of a plurality of devices of FIG. 1 and/or of FIG. 4 in an integrated circuit, for example, the circuit 7 of FIG. 7.

In this example of implementation, it is considered that each antenna ANT1 of a device 1 is stacked to an antenna ANT2 of a device 4 associated with device 1. Each stacking of an antenna ANT1 and of an antenna ANT2 is shown by a hatched square 800 (ANT1, ANT2) in FIG. 8.

In this embodiment, each assembly of a device 1 and of an associated device 4 corresponds to a component having a fixed layout, identical for all the assemblies. Thus, each stack 800 of an antenna ANT1 and of an antenna ANT2 occupies a same surface area. More particularly, in this example, all antennas ANT1 are identical and all antennas ANT2 are identical. Preferably, antennas ANT1 and ANT2 have the same shapes and the same dimensions.

In this embodiment, the stacks 800 of an antenna ANT1 and of an antenna ANT2 are regularly distributed in interconnection structure IT. In other words, the components each corresponding to an association of a device 1 and of a device 4 are regularly distributed in circuit 7.

As illustrated for a single assembly 800 in FIG. 8, it is preferably provided for the layout of the component comprising devices 1 and 4 to respect a distance D greater than 400 µm between antennas ANT1 and ANT2 of the component and circuits ALARM1 and ALARM2 of the component.

It will be within the abilities of those skilled in the art to adapt the above-described example to the case where devices 1 are not each associated with a corresponding device 4.

Figure 9:
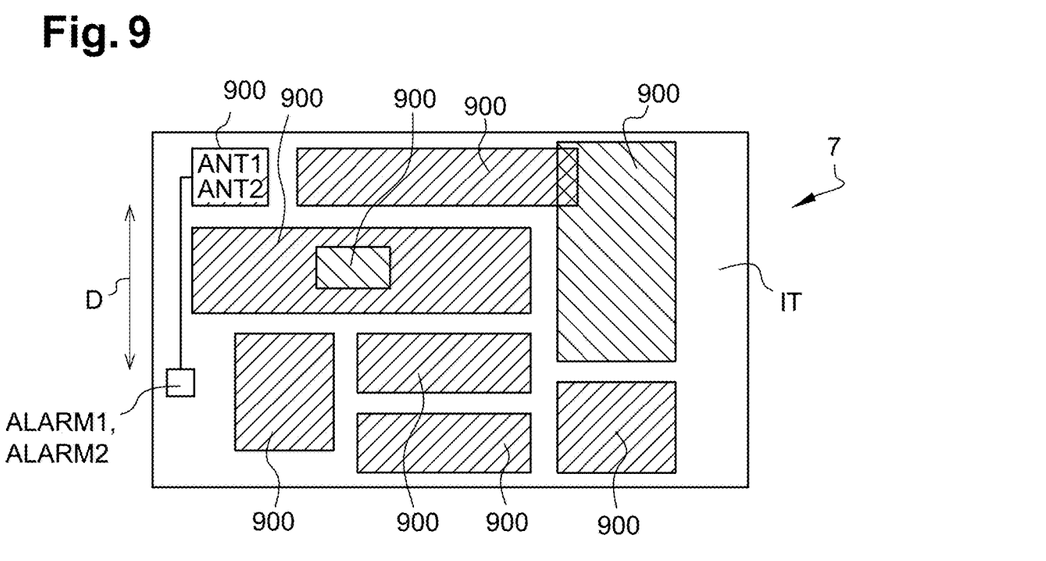
FIG. 9 is a partial simplified top view illustrating another example of implementation of a plurality of devices of FIG. 1 and/or of FIG. 4 in an integrated circuit.

FIG. 9 is a partial simplified top view illustrating another example of implementation of a plurality of devices of FIG. 1 and/or of FIG. 4 in an integrated circuit, for example, the circuit 7 of FIG. 7.

In this example of implementation, it is considered that each antenna ANT1 of a device 1 is stacked to an antenna ANT2 of a device 4 associated with device 1. Each stacking of an antenna ANT1 and of an antenna ANT2 is shown by a hatched square 900 (ANT1, ANT2) in FIG. 9.

In this embodiment, each assembly of a device 1 and of an associated device 4 corresponds to a component having a layout that may be different from one assembly of devices 1 and 4 to another. In practice, this embodiment corresponds to the case where a placement and routing tool is responsible for the shape and the dimension of each antenna ANT1 and ANT2. However, layout rules may be provided to the placement and routing tool, preferably so that the antennas ANT1 and ANT2 of an assembly of a device 1 and of an associated device 4 have the same shapes and the same dimensions and/or are stacked.

In this embodiment, the stacks 900 of an antenna ANT1 and of an antenna ANT2 may occupy different surface areas.

In this example, a first stack 900 of an antenna ANT1 with an antenna ANT2 may be included in a second stack of an antenna ANT1 with an antenna ANT2. In other words, antennas ANT1 and ANT2 of the second stack 900 of antennas may surround antennas ANT1 and ANT2 of the first stack 900 of antennas.

In this example, a first stack 900 of an antenna ANT1 and of an antenna ANT2 may overlap a second stack 900 of an antenna ANT1 and of an antenna ANT2.

Placement and routing rules may be provided to the placement and routing tool, for example, to determine a maximum surface area and/or a minimum surface area for antennas ANT1, ANT2 or, for example, to impose for the distance D between a circuit ALARM1, respectively ALARM2, and antenna ANT1, respectively ANT2, to which it is associated, to be greater than 400 µm.

It will be within the abilities of those skilled in the art to adapt the above-described example to the case where devices 1 are not each associated with a corresponding device 4.

Figure 10:
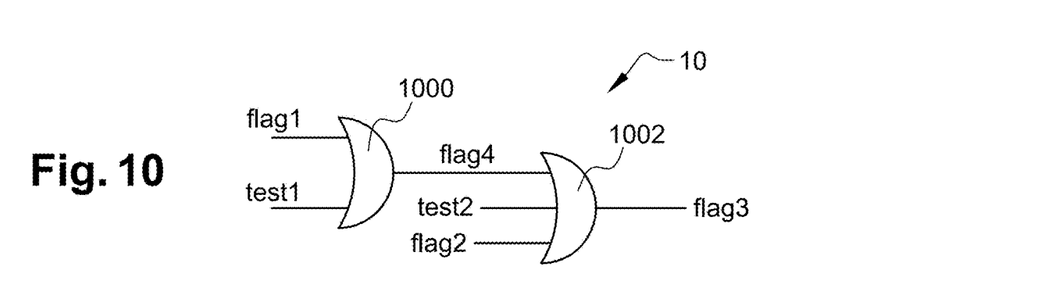
FIG. 10 shows, in the form of a circuit, an embodiment of a circuit for testing one or a plurality of devices of FIG. 1 and/or of FIG. 4.

FIG. 10 shows, in the form of a circuit, an embodiment of a circuit for testing one or a plurality of devices of FIG. 1 and/or of FIG. 4.

More particularly, FIG. 10 shows a circuit 10 enabling to test the integrity of the connection between the output of one or a plurality of circuits ALARM1 and/or ALARM2 and a circuit, for example, circuit CTRL (FIG. 7), configured to process signals flag1 and flag2.

In the shown example, circuit 10 is configured to test the integrity of the connection between the circuit ALARM1 of a device 1 (FIG. 1) and the circuit ALARM2 of a device 4 (FIG. 4) associated with this device 1, and the circuit configured to process the flags flag1 and flag2 output by these circuits.

Circuit 10 is configured to output a signal, or flag, flag3 in the active state if one and/or the other of signals flag1 and flag2 is in the active state. In this example where signals flag1, flag2, and flag3 are at potential Vdd in the active state, circuit 10 is formed of a tree of OR logic gates, each OR gate receiving a signal flag1 or flag2.

More particularly, in the present example, a first OR gate 1000 receives signal flag1 and outputs a signal flag4 in the active state if signal flag1 is in the active state, signal flag4 being at potential Vdd in the active state. Further, a second OR gate 1002 receives signals flag4 and flag2 and outputs signal flag3 in the active state if one or the other of signals flag4 or flag2 is in the active state.

Each OR gate is further configured to receive a test signal having its active state, corresponding in the present example to potential Vdd, forcing the output of the gate to the active state. Thus, when the test signal of an OR gate is placed in the active state, if the signal flag3 received by a processing circuit, for example, circuit CTRL (FIG. 7), does not switch to the active state, this means that the OR gate is defective or that the connection between the output of the OR gate or the processing circuit is interrupted.

More particularly, in the present example, gate 1000 receives a test signal test1 and gate 1002 receives a test signal test2.

Preferably, each OR gate receiving a signal flag1 or flag2 forms part of the circuit ALARM1 or ALARM2 generating this signal, or is adjacent to the circuit.

It will be within the abilities of those skilled in the art to adapt circuit 10 to the case where circuit 10 collects more than one signal flag1 and more than one signal flag2, or to the case where circuit 10 only collects signals flag1. Further, it will be within the abilities of those skilled in the art to adapt circuit 10 to the case where the active state of signals flag1, flag2, flag3, and flag4 corresponds to potential GND, for example, by replacing the OR gates with AND gates.

Various embodiments and variants have been described. Those skilled in the art will understand that certain features of these various embodiments and variants may be combined, and other variants will occur to those skilled in the art. In particular, it will be within the abilities of those skilled in the art to provide, in devices 1 and 4, components of protection against overvoltages, for example, diodes, configured to protect circuits DET1 and DET2 against overvoltages which might occur between the ends of antennas ANT1 and ANT2.

Finally, the practical implementation of the described embodiments and variations is within the abilities of those skilled in the art based on the functional indications given hereinabove. In particular, it will be within the abilities of those skilled in the art to provide antennas having various shapes, for example, antennas having the shape of a circle, of a square, of a spiral, of two adjacent lobes forming a pattern similar to a butterfly's two wings, or also a random shape.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. An integrated circuit comprising: a first electromagnetic pulse detection device comprising:
   a first loop antenna disposed in an interconnection structure of the integrated circuit, a first end of the first loop antenna being connected to a first node of application of a power supply potential and a second end of the first loop antenna being coupled to a second node of application of the power supply potential; and
   a first circuit connected to the second end of the first loop antenna and configured to output a first signal representative of a comparison of a first current in the first loop antenna with a first threshold,
   wherein the second end of the first loop antenna is coupled to the second node by a first resistive element of the first circuit, the first signal being representative of a comparison of a potential of the second end of the first loop antenna with a first potential representative of the first threshold,
   a second electromagnetic pulse detection device comprising:
   a second loop antenna formed in the interconnection structure of the integrated circuit, a first end of the second loop antenna being connected to a third node of application of a reference potential and a second end of the second loop antenna being coupled to a fourth node of application of the reference potential; and a second circuit connected to the second end of the second loop antenna and
   configured to supply a second signal representative of a comparison of a second current in the second loop antenna with a second threshold,
   wherein the first and second electromagnetic pulse detection devices are associated, the first and second loop antennas being stacked on each other and having a same shape and dimensions.

2. The integrated circuit according to claim 1, wherein the first threshold is representative of a presence of an electromagnetic pulse in a region of the interconnection structure, the first loop antenna being arranged in the region.

3. The integrated circuit according to claim 1, wherein a value of the first resistive element is controllable, a modification of the value of the first resistive element causing a modification of a value of the first threshold.

4. The integrated circuit according to claim 1, wherein the first electromagnetic pulse detection device further comprises a second circuit configured to generate a first alarm signal from the first signal output by the first circuit, the second circuit being configured to switch the first alarm signal to an active state and then hold the active state after a switching of the first signal from a state indicating that the first current is smaller than the first threshold to a state indicating that the first current is greater than the first threshold.

5. The integrated circuit according to claim 4, wherein a distance between the first loop antenna and the second circuit is greater than 400 µm.

6. The integrated circuit according to claim 1, wherein the first loop antenna extends over at least two metal levels of the interconnection structure.

7. The integrated circuit according to claim 1, wherein:
   the first threshold is representative of a presence of a positive electromagnetic pulse in a region of the interconnection structure, the first loop antenna being arranged in the region; and the second threshold is representative of a presence of a negative electromagnetic pulse in the region of the interconnection structure, the second loop antenna being arranged in the region.

8. The integrated circuit according to claim 1, wherein:
the second end of the first loop antenna is coupled to the second node by a first resistive element of the first circuit, the first signal being representative of a comparison of a potential of the second end of the first loop antenna with a first potential representative of the first threshold; and the second end of the second loop antenna is coupled to the fourth node by a second resistive element of the second circuit, the second signal being representative of a comparison of a potential of the second end of the second loop antenna with a second potential representative of the second threshold.

9. The integrated circuit according to claim 8, wherein:
a value of the first resistive element is controllable, a modification of the value of the first resistive element causing a modification of a value of the first threshold; and/or
a value of the second resistive element is controllable, a modification of the value of the second resistive element causing a modification of a value of the second threshold.

10. The integrated circuit according to claim 1, wherein:
the first electromagnetic pulse detection device further comprises a third circuit configured to generate a first alarm signal from the first signal output by the first circuit, the third circuit being configured to switch the first alarm signal to an active state and then hold the active state after a switching of the first signal from a state indicating that the first current is smaller than the first threshold to a state indicating that the first current is greater than the first threshold; and the second electromagnetic pulse detection device further comprises a fourth circuit configured to generate a second alarm signal from the second signal output by the second circuit, the fourth circuit being configured to switch the second alarm signal to an active state and then hold the active state after a switching of the second signal from a state indicating that the second current is smaller than the second threshold to a state indicating that the second current is greater than the second threshold.

11. The integrated circuit according to claim 10, wherein a distance between the first loop antenna and the third circuit is greater than 400 µm, and a distance between the second loop antenna and the fourth circuit is greater than 400 µm.

12. The integrated circuit according to claim 1, wherein the first loop antenna extends over a plurality of metal levels of the interconnection structure and/or the second loop antenna extends over the plurality of metal levels of the interconnection structure.

13. The integrated circuit according to claim 1, further comprising more than one of the first electromagnetic pulse detection device, more than one of the second electromagnetic pulse detection device, and a plurality of associations of the first and second electromagnetic pulse detection devices.

14. An integrated circuit comprising:
a first electromagnetic pulse detection device comprising:

a first loop antenna disposed in an interconnection structure of the integrated circuit, a first end of the first loop antenna being connected to a first node of application of a power supply potential and a second end of the first loop antenna being coupled to a second node of application of the power supply potential; and a first circuit connected to the second end of the first loop antenna and configured to output a first signal representative of a comparison of a first current in the first loop antenna with a first threshold; and a second electromagnetic pulse detection device associated with the first electromagnetic pulse detection device, the second electromagnetic pulse detection device comprising:

a second loop antenna formed in the interconnection structure of the integrated circuit, a first end of the second loop antenna being connected to a third node of application of a reference potential and a second end of the second loop antenna being coupled to a fourth node of application of the reference potential; and a second circuit connected to the second end of the second loop antenna and configured to supply a second signal representative of a comparison of a second current in the second loop antenna with a second threshold;

wherein the first and second loop antennas are stacked on each other and have a same shape and dimensions, and wherein the first and second loop antennas extend over a plurality of metal levels of the interconnection structure.

15. The integrated circuit according to claim 14, wherein:
the first threshold is representative of a presence of a positive electromagnetic pulse in a region of the plurality of metal levels of the interconnection structure; and the second threshold is representative of a presence of a negative electromagnetic pulse in the region of the plurality of metal levels of the interconnection structure.

16. The integrated circuit according to claim 14, wherein:
the first electromagnetic pulse detection device further comprises a third circuit configured to generate a first alarm signal from the first signal output by the first circuit, the third circuit being configured to switch the first alarm signal to an active state and then hold the active state after a switching of the first signal from a state indicating that the first current is smaller than the first threshold to a state indicating that the first current is greater than the first threshold; and the second electromagnetic pulse detection device further comprises a fourth circuit configured to generate a second alarm signal from the second signal output by the second circuit, the fourth circuit being configured to switch the second alarm signal to an active state and then hold the active state after a switching of the second signal from a state indicating that the second current is smaller than the second threshold to a state indicating that the second current is greater than the second threshold.

17. The integrated circuit according to claim 16, wherein a distance between the first loop antenna and the third circuit is greater than 400 µm, and a distance between the second loop antenna and the fourth circuit is greater than 400 µm.

* * * * *

UNITED STATES PATENT AND TRADEMARK OFFICE
CERTIFICATE OF CORRECTION

| | |
|---|---|
| PATENT NO. | : 11,531,049 B2 |
| APPLICATION NO. | : 17/322140 |
| DATED | : December 20, 2022 |
| INVENTOR(S) | : Clement Champeix |

It is certified that error appears in the above-identified patent and that said Letters Patent is hereby corrected as shown below:

In the Claims

Claim 1, Column 14, Line 6; insert a carriage return after "comprising:".

Claim 1, Column 14, Line 17; delete "threshold," and insert --threshold;--.

Claim 1, Column 14, Line 23; delete "threshold," and insert --threshold; and--.

Claim 1, Column 14, Line 33; delete the carriage return after "and".

Claim 1, Column 14, Line 36; delete "threshold," and insert --threshold;--.

Signed and Sealed this
Seventh Day of February, 2023

Katherine Kelly Vidal
*Director of the United States Patent and Trademark Office*